United States Patent Office 3,412,071
Patented Nov. 19, 1968

3,412,071
POLYURETHANES CURED WITH
POLYAMINE CURING AGENTS
Norman K. Sundholm, Middlebury, Conn., assignor to Uniroyal, Inc., a corporation of New Jersey
No Drawing. Application Dec. 23, 1964, Ser. No. 420,784, which is a continuation-in-part of application Ser. No. 383,974, July 20, 1964. Divided and this application Oct. 4, 1966, Ser. No. 584,084
1 Claim. (Cl. 260—75)

ABSTRACT OF THE DISCLOSURE

Mixtures of polyamines formed by condensation, in the presence of an acid, of aniline, 2-chloroaniline, and formaldehyde are improved curing agents for liquid isocyanate-terminated polyurethanes.

---

This application is a division of my application Ser. No. 420,784 filed Dec. 23, 1964 (now abandoned), which is in turn a continuation-in-part of my application Ser. No. 383,974, filed July 20, 1964 (now abandoned).

This invention relates to new chemical compositions which are curing agents for polyurethanes. More particularly the invention relates to condensation products of aniline and 2-chloroaniline with formaldehyde, as well as to a method of making such condensation products, and to the use of such condensation products as curing agents for isocyanate-terminated polyurethanes.

In one important aspect, the invention relates to the curing of liquid polyurethanes containing isocyanate end groups. Such polyurethanes are usually prepared by reacting an excess of an organic diisocyanate with a long-chain glycol. Generally the glycols used are polyether glycols or polyester glycols. The molar ratio of diisocyanate to glycol should be greater than one and is preferably large enough so that the polyurethane is liquid. Such liquid polyurethanes are generally called prepolymers.

Curing agents for these prepolymers are compounds which contain more than one active hydrogen-containing group capable of adding to the isocyanate group. Glycols and diamines are such compounds. Water can also be used; it functions by reacting with an isocyanate group to form a primary amino group. The plurality of the addition reactions results in chain extension. The ratio of reactants is usually chosen so that an excess of isocyanate groups is present. These react with active hydrogen-containing groups in the polymer chain (e.g., urethane groups), to give branch points which result in cross-links. See pp. 273–4, Polyurethanes: Chemistry and Technology. I. Chemistry by J. H. Saunders and K. C. Frisch, Interscience Publishers, 1962, for a description of the chemical reactions involved in the curing action.

Examples of curing agents (chain extenders) conventionally used are 4,4′-methylenebis(2-chloroaniline), 3,3′-dichlorobenzidine, 1,4-butanediol, and hydroquinone bis(2-hydroxyethyl) ether. The diamines are preferred over the blycols since they react faster and thus have shorter cure times, and generally give better properties, such as higher tensile strength and higher hardness, after curing.

In commercial practice the diamine is usually mixed as a liquid with the prepolymer so as to have quick and facile mixing. If the diamine is a solid, it is melted before mixing. The diamine which is conventionally used to the greatest extent for this purpose is 4,4′-methylenebis (2-chloroaniline). Unfortunately, this diamine tends to solidify in the liquid polyurethane prepolymer before it is completely blended into the polymer, unless the polymer is preheated. Such premature solidification of the diamine will result in polymer-diamine mixes which cannot be cured or which on curing give stocks having inferior properties. The alternative is to heat the prepolymer to sufficiently high temperatures so that the 4,4′-methylenebis (2-chloroaniline) will remain liquid during the mixing; this procedure has two unsatisfactory aspects. One is that high temperatures have deleterious effects on the properties of the prepolymer. Its isocyanate content decreases and its viscosity increases, when it is heated above about 70° C. This is due, at least partially, to the reaction of the isocyanate groups with urethane groups to form allophanate groups; this results in the formation of cross-links. The other aspect is the shortening of the pot life, the elapsed time from the addition of the curative until the mixture becomes unpourable. If the pot life is too short, there is not sufficient time for the mixing and pouring operations.

The present invention is based on the surprising discovery that certain mixtures of aniline and 2-chloroaniline can be reacted with formaldehyde to provide new and useful compositions which are effective curing agents for polyurethanes. The new curative compositions display unexpected and valuable properties, in comparison to heretofore available diamine curatives. One such important property is the ability to supercool, that is, when a new curative composition of the invention is heated to a temperature at which it is liquid, it can thereafter be cooled down to a temperature much lower than the temperature at which is was melted, without tending to resolidify readily. For example, certain products of the invention melted at temperatures slightly above 70° C. cool to 30° C. before solidifying. The importance of this is that the aforementioned difficulty experienced with the conventional 4,4′-methylenebis(2-chloroaniline), namely, premature solidification of the molten diamine in the polymer mix unless the polymer is excessively preheated, is not encountered since the new curatives of the invention do not resolidify readily, but instead supercool remarkably. Commercial samples of the conventional 4,4′-methylenebis(2-chloroaniline), in contrast, melt in the range 99–109° C. and resolidify in the range 85–99° C.

An outstanding advantage of the new curative compositions of the invention is that their low solidification points permit processing at reduced temperatures, with resultant longer pot life. Another advantage of the present molten curatives which solidify at low temperatures is that there is less likelihood that the curative will solidify in and plug up the lines carrying it to the mixer. Less elaborate, if any, precautions are necessary to insure its remaining liquid. The curative compositions of the invention are the mixtures of diamines obtained by condensing formaldehyde with certain mixtures of aniline and 2-chloroaniline in the presence of an acid. The compositions are evidently mixtures to a large degree of 4,4′-methylenedianiline (I), 3 - chloro - 4,4' - diaminodiphenylmethane (II), and 4,4'-methylenebis(2-chloroaniline) (III):

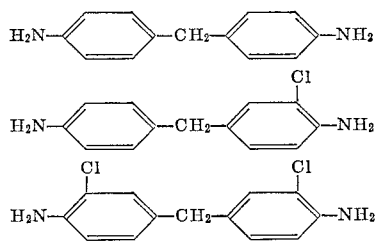

Experimentation has shown that the novel compositions having solidification points below that of 4,4'-methylenebis(2-chloroaniline) and having satisfactory pot lives are those prepared from mixtures of aniline and 2-chloroaniline in which the molar ratio of aniline to 2-chloroaniline, respectively, is in the range 3:1 to 1:19. Condensation products produced from mixtures richer in aniline have pot lives which are too short for general utility. Products from mixtures richer in 2-chloroaniline have solidification points approaching that of 4,4'-methylenebis(2-chloroaniline).

The amount of formaldehyde used should be such that the molar ratio of the total amines to the formaldehyde is at least about 2:1, that is, about 2:1 or higher (e.g., 4:1, 5:1, 10:1, or more). Unreacted amines are removed from the condensation products by vacuum or steam distillation.

The condensations are carried out in inert solvents. Water is preferred; but organic solvents such as the lower alcohols (e.g., methanol, ethanol, and isopropanol) are also suitable, as well as ethers, lower aliphatic acids, aromatic hydrocarbons, etc.

The condensation is promoted by acids; it is preferred to use one of the strong mineral acids such as hydrochloric or sulfuric, but other inorganic or organic acids may be used such as phosphoric, p-toluenesulfonic, oxalic, dichloroacetic, and trichloroacetic. The amount of acid used is not critical; it is not necessary to use one equivalent of acid per mole of total amines. For example, when hydrochloric acid is used with water as the solvent, 0.9, 1, 1.5, and 3 equivalents of acid per mole of total amines give high yields of products having similar, maximum properties; when 0.5 equivalent is used, a product of lower quality is obtained in reduced yield. When 1.25 equivalents of sulfuric acid is used, good results are obtained. When hydrochloric acid is used with ethanol as the solvent, 0.5, 1, 1.5, and 3 equivalents of acid per mole of total amines give high yields of products having good properties, while 0.25 equivalent gives inferior results. The useful amounts of acid are usually within the range from 0.25 to 3 equivalents of acid per mole of total amines, but 0.1 to 10 equivalents may be used.

The condensations are best carried out at moderately increased temperatures; the preferred temperature range is 50–100° C., although lower and higher temperatures may be used (e.g. 20–150° C.).

Example I

The preparation of one of the curative products of this invention, in which the molar ratio of aniline:2-chloroaniline:formaldehyde is 2:2:1, respectively, is given as an example:

To a stirred solution of 93 grams (1 mole) of aniline, 127.5 grams (1 mole) of 2-chloroaniline, and 166.7 ml. (2 moles) of concentrated hydrochloric acid in 1 liter of water at 70° C. was added 40.5 grams (0.5 mole) of 37% formaldehyde during one hour. After completion of the addition, the mixture was heated at 70° C. for three hours; 150 ml. of 28–30% aqueous ammonia was added. The organic layer was subjected to steam distillation to remove excess monoamines. The residual oil was dissolved in about 200 ml. of benzene, and the benzene solution dried with solid potassium hydroxide. The benzene was evaporated under reduced pressure to leave 110.5 grams of a brown oil which solidified in one-half hour at 30° C. with occasional scratching. It then melted in the range 61–74° C.

Some of the products of this invention have been examined by gas-liquid chromatography, which shows the presence of three major components. The component having the shortest retention time has the same retention time as 4,4'-methylenedianiline (I); the component having the longest retention time has the same retention time as 4,4'-methylenebis(2-chloroaniline) (III). It is evident that the component having the intermediate retention time is the new compound, 3 - chloro-4,4'-diaminodiphenylmethane (II), formed by the condensation of one molecule each of aniline and 2-chloroaniline with one molecule of formaldehyde.

It is believed that it is due to the presence of this monochloro compound that these products have such god properties, i.e., low melting point, high degree of supercooling, and long pot life. For example, the properties of the product obtained by condensing aniline, 2-chloroaniline, and formaldehyde in the molar ratio 2:2:1 have been compared with the properties of the equimolar mixture of 4,4'-methylenedianiline and 4,4' - methylenebis-(2-chloroaniline). The product of this invention melts at 61–74° C., supercools to 30° C. before solidifying, and has a pot life in a commercial polymer at 80° C. of 7 minutes; the equimolar mixture of the two diamines melts at 77–87° C., supercools to only 68° C., and has a pot life in the same polymer at 80° C. of but 2 minutes.

Example II

This example illustrates the manner of use of the mixed condensation products of the invention as curatives for a liquid polymethane prepolymer.

A suitable conventional prepolymer may be made from a hydroxy-terminated polyethylene adipate polyester, molecular weight 1220, acid value less than 1, water content not more than 0.1%. To 1000 grams of such polyester may be added with stirring 270 grams of 2,4-toluene diisocyanate. The mixture may be heated until the equivalent weight of the liquid, isocyanate-terminated prepolymer formed is about 1300 (that is, equivalent weight with respect to reactivity with amine, also called the "amine equivalent," which may be determined by the method referred to at p. 29 of the Saunders and Frisch reference cited above).

A series of curatives of the invention may be prepared, using the procedure of Example I, and employing, as shown in Table I, various molar ratios of aniline to 2-chloroaniline (A:C) and various molar ratios of total amines to formaldehyde (A+C:H$_2$CO). Table I also shows the melting range, solidification temperature, and neutralization equivalent (the weight of the product required to react with 1 equivalent of acid; a measure of the available amine content and a measure of the ability to react with isocyanate) of the various curatives.

To evaluate the curatives, they are weighed out in quantities to provide 0.9 equivalent of amine per isocyanate equivalent using 150 grams of prepolymer. The curatives which melt below 80° C. are heated to that temperature; those which melt higher are melted and cooled to 80° C. The polymer heated to 80° C. is added. After blending and centrifuging for 1½ minutes, 80 grams of the polymer-curative blend is poured into a mold 7 x 7 x 0.075 inches and press-cured at 100° C. for 1 hour. The cured sheets are removed and post-cured for 16 hours at 100° C. The remainder of the blend is kept in an oven at 80° C. and the elapsed time from mixing until the blend becomes unpourable observed; this is the pot life. Physical properties of the cured elastomeric sheets are determined, as shown in Table I.

The physical properties of the stock cured with 4,4'-methylenebis(2-chloroaniline) are: tensile strength of 5200 p.s.i., elongation of 380%, 300% modulus of 1390 p.s.i. Shore A hardness of 74, and split tear of 48 p.l.i. It has a pot life of 17 minutes at 80° C. in the same polymer. 4,4'-methylenedianiline has a pot life so short, under a minute, that a satisfactory hand-mixed casting could not be made with it.

ly the molar ratio of diisocyanate to glycol is in the 1.2:1 to 3:1 range. For additional examples of suitable starting materials for making polyurethanes, reference may be had to the following: Otto Bayer in "Angewandte Chemie," A/59 (1947), No. 9, p. 264; U.S. Patent 3,105,062, Graham and Gregg, Sept. 24, 1963. It will be

TABLE I

| Molar ratio, A:C [1] | Molar ratio, A+C:H₂CO | Melting range, °C. | Solidification temp., °C. [2] | Neut. equiv. | Pot life at 80° C., min. | Tensile strength, p.s.i. | Elongation, percent | 300% modulus, p.s.i. | Hardness, Shore A | Split tear ASTM D-470, p.l.i. |
|---|---|---|---|---|---|---|---|---|---|---|
| 1:19 | 4:1 | 97-107 | 71 | 136 | 17 | 6,300 | 450 | 1,210 | 71 | 40 |
| 1:9 | 4:1 | 90-103 | 64 | 133 | 17 | 5,600 | 400 | 1,770 | 73 | 43 |
| 1:3 | 4:1 | 76-94 | 42 | 130 | 14 | 5,200 | 380 | 1,830 | 71 | 45 |
| 1:2 | 4:1 | 55-88 | 40 | 128 | 10 | 5,900 | 440 | 1,420 | 71 | 55 |
| 1:1 | 4:1 | 61-74 | 30 (0.5 hr.) | 118 | 7 | 5,900 | 440 | 1,530 | 71 | 43 |
| 1:1 | 2:0.8 | 35-46 | 25 (4 days) | 121 | 7 | 6,200 | 450 | 1,630 | 72 | 38 |
| 1:1 | 2:0.9 | 32-45 | 25 (10 days) | 119 | 5 | 5,300 | 390 | 2,100 | 73 | 31 |
| 1:1 | 2:1 | 30-46 | 25 (31 days) | 122 | 5 | 3,900 | 260 | 2,500 | 74 | 27 |
| 2:1 | 4:1 | 62-79 | 25 (2 hrs.) | 113 | 3 | 6,100 | 410 | 1,800 | 72 | 49 |
| 3:1 | 4:1 | 60-73 | 25 (3 days) | 112 | 2 | 6,400 | 490 | 1,600 | 72 | 45 |

[1] Water was used as the reaction solvent; the reaction temperature was about 70° C. One equivalent of hydrochloric acid was used per mole of the total amount of amines used.
[2] With agitation by scratching; the period of time in parentheses is the approximate time for solidification; if no time is given, solidification takes place within minutes.

The data show that it is possible by application of the principles of this invention to prepare a product which solidifies at least 20 degrees lower than 4,4'-methylenebis (2-chloroaniline) but has a pot life equal to it. This is the condensation product of a 1:9 molar ratio mixture of aniline and 2-chloroaniline, respectively, with formaldehyde using a 4:1 molar ratio of total amines to formaldehyde, respectively. As the molar ratio of aniline to 2-chloroaniline is increased, the solidification temperature and the pot life decrease.

Using the 1:1 molar ratio of aniline to 2-chloroaniline, as the molar ratio of the total amines to formaldehyde is decreased the solidification temperature decreases or the solidification time, at the same temperature, increases; also the pot life decreases, but not markedly. There is also a general decrease in the useful physical properties of the cured polymer as the molar ratio of the total amines to formaldehyde approaches 2:1, the tensile strength, elongation, and tear strength decrease, and the modulus increases. The limit of useful properties in the cured polymer is at the point where the curvative is prepared using a molar ratio of total amines to formaldehyde of about 2:1.

It will be understood that the invention is applicable to the curing of conventional polyurethane prepolymers in general. As is well known to those skilled in this art such materials are produced from an organic compound rich in hydroxy groups, usually a polymer having at least two terminal hydroxy groups, frequently a polyether or polyester, and an organic polyisocyanate, usually a diisocyanate. The polymer used for reaction with the polyisocyanate to make the polyurethane is frequently a polyether or polyester glycol having a molecular weight of from 400 to 6000, preferably in the 1000-2000 range. Mention may be made of chain extended polyesters made from a glycol (e.g., ethylene and/or propylene glycol) and a saturated dicarboxylic acid (e.g., adipic acid). Usually the starting glycol contains from 2 to 20 carbon atoms and the acid contains from 4 to 12 carbon atoms. Polyethylene adipate, polyethylene adipate-phthalate, polyneopentyl sebacate, etc. may be mentioned. Small amounts of tri-alcohols such as trimethylolpropane or trimethylolethane may be included. There may also be mentioned the polyethers, such as polypropylene glycol, polypropylene-ethylene glycol and polytetramethylene glycol. Among the suitable polyisocyanates may be mentioned m- and p-phenylene diisocyanates; toluene diisocyanate; p,p'-diphenylmethane diisocyanate; 3,3'-dimethyl (or dimethoxy)-4,4'-biphenyl diisocyanate; 1,5-naphthylene diisocyanate; p,p',p'' - triphenylmethane triisocyanate; p-phenylene diisothiocyanate, etc. The isocyanate is of course used in amount at least equivalent to the hydroxyl groups in the starting polymer; larger quantities of diisocyanate favor formation of liquid prepolymer. General-understood that the present curative compositions may be used in the same proportions and under the same curing conditions as conventional diamine curatives. Almost invariably the proportions of diamine curative to prepolymer are such as to provide from about 0.5 to about 1.1 equivalents of amine per isocyanate equivalent in the prepolymer. The curative in the molten state is blended with the liquid prepolymer and is then shaped, for example, cast, molded, spread on cloth or otherwise used to coat and/or impregnate. While in the desired shape the mixture is heated to expedite cure, for example, to a temperature of 50-250° C. for ½-48 hours (time and temperature of cure being generally inversely related) depending on such factors as the particular prepolymer used, the amount of curative, the degree of cure desired, the size of the article, the character of the heating device, etc. It will be understood that the curing conditions are not critical, but simply follow conventional practice.

The new compound, 3-chloro-4,4'-diaminodiphenylmethane (II), was isolated and purified as follows: Using the procedure given above for the preparation of one of the products of this invention, 1 mole of formaldehyde was reacted with a mixture of 1 mole of aniline and 3 moles of 2-chloroaniline in the presence of 4 moles of hydrochloric acid. By gas-liquid chromatography the product was shown to contain about 1% of 4,4'-methylenedianiline, about 30% of the new compound, and about 69% of 4,4'-methylenebis(2-chloroaniline). Experimentation has shown that 4,4'-methylenedianiline is soluble and 4,4'-methylenebis(2-chloroaniline) is almost insoluble in 20% acetic acid. This is evidently due to the effect of the chlorine atom substituted on the benzene ring in reducing the basicity of the amino group on that ring. Since the new compound contains one amino group on a benzene ring unsubstituted with a chlorine atom, it would be expected to be soluble in 20% acetic acid. Accordingly, to effect separation of the new compound and the small amount of 4,4'-methylenedianiline from the dichloro compound, 245 grams of the product was dissolved in 2 liters of benzene and extracted with nine 1-liter portions of 20% acetic acid. Each extract was made alkaline with aqueous ammonia. The oil formed readily solidified. The solid was collected by filtration, washed with water, and dried. It was recrystallized from 80% ethanol to afford 5.5 grams of colorless crystals melting at 82-83° C. Elemental analysis of this purified material and its infrared spectrum are consistent with the monochloro compound.

*Analysis.*—Calculated for $C_{13}H_{13}ClN_2$: C, 67.10; H, 5.59; Cl, 15.27; N, 12.04. Found: C, 67.40; H, 5.78; Cl, 15.02; N, 12.12

The low melting point of 82-83° C. of the new compound (II), since it is below that of (I) (93° C.) and below that of (III) (110° C.), is particularly desirable from the standpoint of blending with a polyurethane prepolymer for the purpose of making a curable composition in accordance with the invention. Thus, the invention contemplates the use, as a curative for a prepolymer, of either the new chemical (II) itself, or curative mixtures containing at least about 2% of (II).

Having thus described my invention, what I claim and desire to protect by Letters Patent is:

1. A cured polyurethane prepared by reacting at a temperature of between 50° C. and 250° C. for ½ to 48 hours
   (1) one equivalent of a liquid isocyanate-terminated polyurethane prepolymer with
   (2) 0.5 to 1.1 equivalents of a curing agent prepared by condensing in the presence of an acid (i) aniline, (ii) 2-chloroaniline, and (iii) formaldehyde in which the molar ratio of aniline to 2-chloroaniline is 3:1 to 1:19 and the molar ratio of the sum of aniline and 2-chloroaniline to formaldehyde is from about 2:1 to 10:1.

References Cited

UNITED STATES PATENTS

| | | | |
|---|---|---|---|
| 2,765,341 | 10/1956 | Wirth et al. | 260—571 |
| 2,888,439 | 5/1959 | Simons | 260—77.5 |
| 3,012,008 | 12/1961 | Lister | 260—75 |
| 3,036,996 | 5/1962 | Kogon | 260—77.5 |
| 3,097,191 | 7/1963 | France et al. | 260—77.5 |
| 3,105,062 | 9/1963 | Graham et al. | 260—75 |
| 3,188,302 | 6/1965 | Lorenz | 260—77.5 |
| 3,194,793 | 7/1965 | Kogon | 260—77.5 |
| 3,197,440 | 7/1965 | Verbanc | 260—77.5 |
| 3,253,031 | 5/1966 | Powers | 260—571 |
| 3,297,758 | 1/1967 | Hoeschele | 260—570 |

FOREIGN PATENTS

| | | |
|---|---|---|
| 935,606 | 8/1963 | Great Britain. |
| 1,179,945 | 10/1964 | German Auslegeschrift. |
| 1,210,872 | 1/1966 | German Auslegeschrift. |
| 1,371,567 | 7/1964 | France. |

OTHER REFERENCES

"Curalon–L," Bulletin of United States Rubber Company, Bulletin Number 200–B45.

Rubber Age, "Effect of Amine Structure on the Properties of Cured Polyurethane," vol. 89, No. 2, May 1961, pp. 263–268 cited as being of interest.

DONALD E. CZAJA, *Primary Examiner.*

F. McKELVEY, *Assistant Examiner.*